United States Patent [19]
Conklin, III et al.

[11] Patent Number: 6,076,272
[45] Date of Patent: Jun. 20, 2000

[54] SINGLE PLATE COMPACTION AND SEAL DESIGN FOR A COMPRESSED AIR DRYER

[76] Inventors: Richard J. Conklin, III, 29101 Foote Bay Village Dr., Bay Village, Ohio 44140; Scott McGill Alexander, 3 Greenbanks Drive, Barry, South Glamorgan, CF62 8HZ, United Kingdom

[21] Appl. No.: 09/182,690

[22] Filed: Oct. 29, 1998

[51] Int. Cl.[7] .................................................. F26B 21/02
[52] U.S. Cl. ...................... 34/80; 34/82; 96/138; 96/151; 55/385.3
[58] Field of Search ................................. 34/71, 80, 81, 34/82, 209; 96/134, 136, 141, 147, 151, 138; 55/318, 319, 385.3

[56] References Cited

U.S. PATENT DOCUMENTS

| | | | |
|---|---|---|---|
| 4,544,385 | 10/1985 | Tanaka | 55/208 |
| 4,572,725 | 2/1986 | Kojima | 55/274 |
| 4,713,094 | 12/1987 | Yanagawa et al. | 55/163 |
| 5,595,588 | 1/1997 | Blevins | 96/108 |
| 5,607,500 | 3/1997 | Shamine et al. | 96/144 |
| 5,622,544 | 4/1997 | Shamine et al. | 96/134 |

*Primary Examiner*—Pamela A. Wilson

[57] ABSTRACT

A compressed air dryer assembly for an air braking system provides for uniform compression of a desiccant bed. Guidance of a housing urged into a dryer shell by a spring force is provided at radially inner and outer regions. This guidance allows for a wide range of movement so that the desiccant bed is maintained under uniform compression. In addition, a sliding seal effectively provides a wide range of movement and yet limits communication between the inlet and outlet openings.

18 Claims, 2 Drawing Sheets

SINGLE PLATE COMPACTION AND SEAL DESIGN FOR A COMPRESSED AIR DRYER

BACKGROUND OF THE INVENTION

This invention relates to a compressed air braking system and more particularly to an air dryer assembly used to remove moisture entrained in the air.

Trucks, buses, and related heavy-duty vehicles often employ an air braking system in which compressed air from a source or storage reservoir is selectively applied and released from brake chambers associated with the wheels. It is important to control the moisture content of the compressed air, particularly because moisture can adversely affect operation of the braking system. Air dryers are commonly used to remove the moisture from the compressed air.

The air dryer includes a desiccant material, such as desiccant beads, enclosed in a cavity through which the compressed air is introduced. Since the desiccant material adsorbs moisture, it is necessary to periodically regenerate the desiccant material by a purge flow. Although effective for some period of time, the desiccant material breaks down over time and requires occasional replacement. Thus, it is desirable that air dryer be easily assembled and disassembled.

In addition, voids in the desiccant bed or non-compacted regions of desiccant can lead to premature breakdown or powdering of the desiccant beads. Therefore, a loading force across the desiccant bed which assures compression and/or compaction which, in turn, prolongs the useful life of the desiccant beads.

It is also known that under non-uniform compression, the desiccant material will not flow from a high-pressure area to a low pressure area without an additional, constantly applied force. To maximize the effective operation of the desiccant, it is thus desirable to uniformly load the desiccant bed and thereby minimize areas of non-flow.

It is also known that desiccant beds shift during use. Flexibility is required to permit this shifting and to date known structures do not effectively address this concern. Thus it is important to allow shifting while still uniformly compacting the desiccant bed. Structures to date have not effectively achieved these goals.

In conjunction with even force application and accommodating movement of the desiccant bed, it is necessary to maintain separate inlet and outlet air paths or passages in a manner that still achieves the above goals.

Accordingly, a need exists for an improved compressed air dryer assembly that provides a reliable assembly and advantageously achieves these results in an economic manner.

SUMMARY OF THE INVENTION

The present invention contemplates a new and improved compressed air dryer assembly that overcomes the above-referenced problems and others and provides an economical, effective assembly.

According to the present invention, the compressed air dryer includes a shell having an open end for receiving additional components of the assembly, including a desiccant material therein. A housing is dimensioned for receipt in the shell through the open end holding desiccant between the housing and shell. An annular plate is received in the shell behind the housing to secure the assembly together. A biasing member urges the housing to compress the desiccant while a guide member extends into the housing to properly orient the housing in the shell for uniform compaction of the desiccant.

According to another aspect of the invention, guiding is provided in a central region by an annular wall received in a recess of the housing.

According to another aspect of the invention, the housing and the annular wall are sealed relative to one another by a sliding seal which separates the inlet and outlet air streams through the air dryer assembly.

According to yet another aspect invention, an internal flow bypass past the sliding seal is permitted should the air dryer become plugged.

A principal advantage of the invention is found in the uniform compaction or compression of the desiccant bed while still permitting flexibility and allowing the bed to shift during use.

Yet another advantage of the invention resides in the ability to effectively separate the inlet and outlet air passages through the dryer while achieving these other goals.

A still further advantage of the invention is found in the simplified structure and assembly that is economical to manufacture and easy to use.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which is described in this specification and illustrated in the accompanying drawings. The drawings include.

DETAILED DESCRIPTION OF THE PREFERRED EMBODIMENTS

Figure 1:
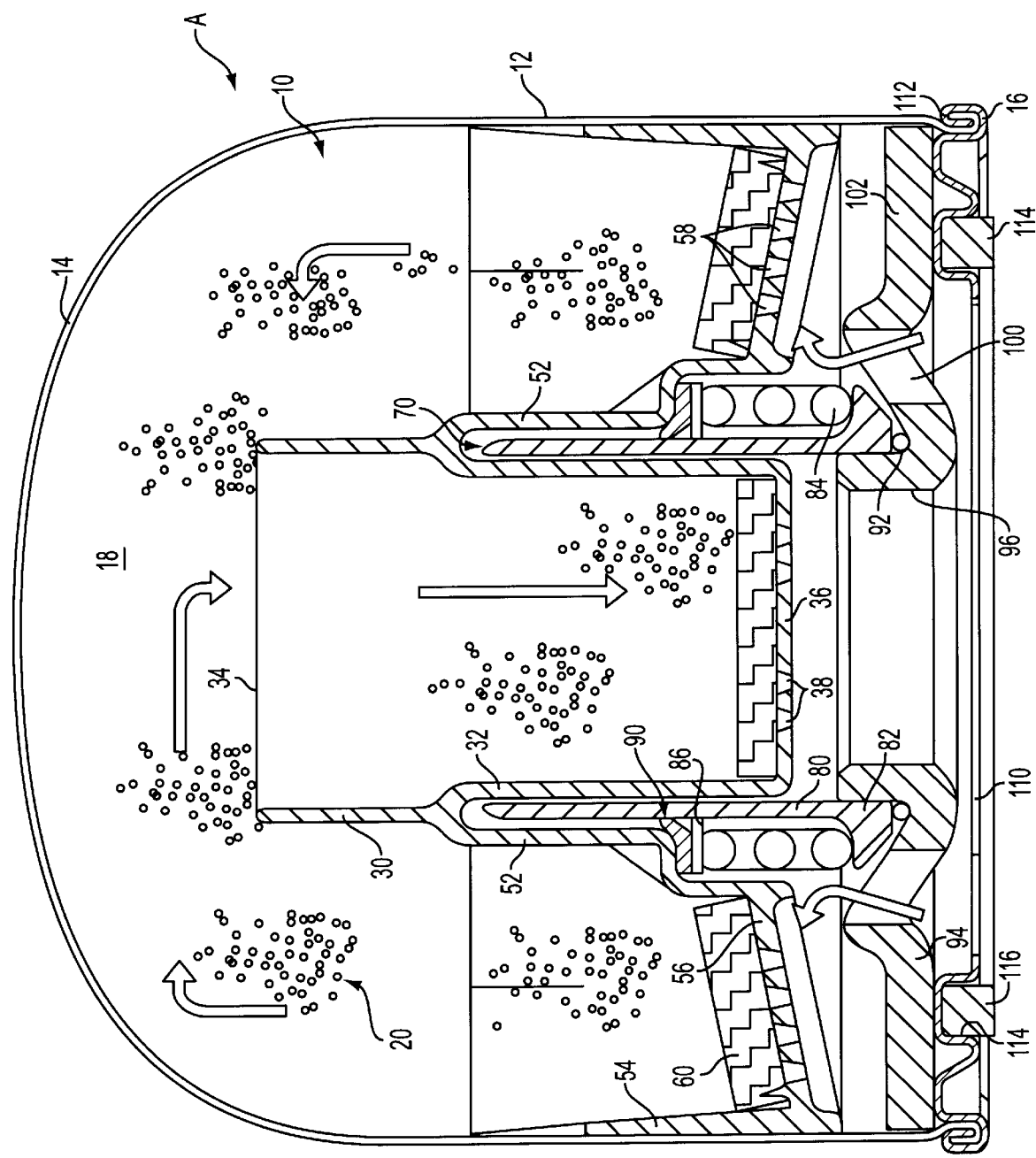
FIG. 1 which is a longitudinal cross-sectional view of a preferred embodiment of the invention.

Referring now to the drawings wherein the showings are for purposes of illustrating the preferred embodiments of the invention only, and not for purposes of limiting the invention, the FIGURES show an air dryer A for a compressed air braking system. More particularly, the air dryer includes an outer housing or shell 10 having a cylindrical sidewall portion 12 that merges into an end wall 14 having a generally domed configuration. The opposite end 16 of the shell is open and adapted to receive the various components of the air dryer assembly.

Received in an internal cavity 18 defined by the shell is a desiccant material 20. The desiccant material is a well-known material used in air dryers for compressed air braking systems and typically comprises beads which together define a bed through which compressed air flows and from which water is removed and entrained on the beads. A reverse or purge air flow, in turn, removes the moisture from the beads to regenerate the air dryer for subsequent use.

Figure 2:
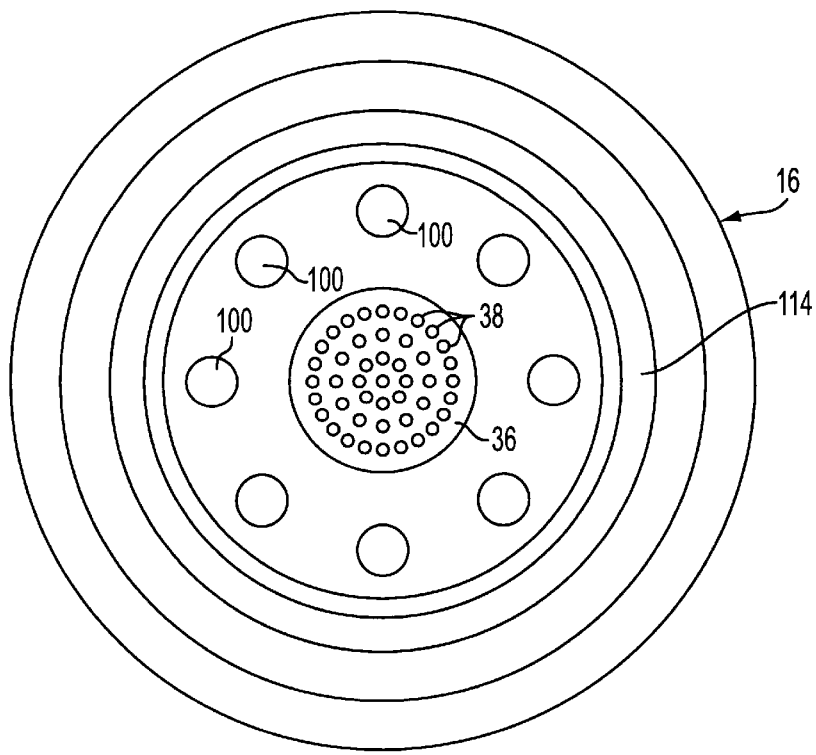
FIG. 2 is a bottom plan view of the invention.

A generally cup-shaped housing 30 is received in the shell for trapping the desiccant between the housing and shell. The housing includes a central cylindrical portion 32 having an open end or tower 34 that faces into the shell cavity 18. A lower surface 36 of the central region includes a series of outlet openings 38 (FIGS. 1 and 2) which collectively define an outlet for the air during normal operation. As will be appreciated, the desiccant beads extend into the central portion 32 of the housing so that the flow path of the air through the air dryer maximizes air contact with the desiccant material.

Received over the end surface 36 and covering the openings 38 is a filter, preferably defined by a felt or polypropylene mat. Since the housing and the filter are both formed of plastic materials, they are heat sealed together to prevent the desiccant beads from exiting the housing and shell.

The housing further includes an outer annular cup portion defined by generally concentric inner and outer walls 52, 54, respectively. A base or lower wall 56 connects these generally parallel walls 52, 54 and includes openings 58 therein defining inlets for the passage of air into the cavity 18. Just as the outlet openings are covered with a filter, so, too, are the inlet openings covered by a filter 60. The filter 60 is also preferably a felt or polypropylene mat that can be heat staked or secured to the housing. The outer wall 54 has thin-walled portions circumferentially spaced along an upper edge to allow some limited flexing of the outer wall in a radial direction as it engages the interior surface of the shell along sidewall 12. Moreover, the outer wall 54 preferably has a slight radially outward taper from base wall 56 toward the open, upper edge thereof. The taper serves a number of purposes. It provides a scraping edge that contains the desiccant beads between the housing and shell. The taper also allows tolerance stack up in the assembly and provides partial guiding of the housing in the shell while minimizing the frictional effects between the housing and the shell wall.

The concentric wall portions 32 of the inner portion of the housing and wall 52 of the outer annular portion are disposed in generally parallel relation and define a recess 70 therebetween. This annular recess 70 serves an important purpose in the air dryer assembly, allowing flexibility and tolerating misalignment between the components of the air dryer assembly through a large range of motion. In addition, it provides for central guiding of the housing in conjunction with the outer wall 54 so that compaction or compressive forces imposed on the desiccant beads are uniformly distributed.

More specifically, a guide member or center tube 80 extends at least partially into the recess 70. The center guide member includes a shoulder 82 on an external portion thereof that defines a seat for one end of a compression spring 84. The other end of the spring engages a washer 86 disposed beneath a sliding seal 90. In the preferred embodiment, the spring is a coil spring that has a diameter substantially the same as the inner wall 52 so that compressive forces act through a central portion of the housing against the desiccant bed of course, other types of springs can be used without departing from the scope and intent of the subject invention.

The lower end of the guide tube preferably includes a seal member 92 along the circumferential surface where it engages an annular tapping plate 94. The annular plate has a central threaded opening 96 that allows the air dryer assembly to be conveniently and easily screwed on and off an externally threaded member (not shown). The center guide member and the annular seal are pressed against the annular plate via the biasing force provided by spring 84. This prevents communication between the inlet and outlet passages of the air dryer. A series of circumferentially spaced inlet openings 100 are provided in the annular plate radially outwardly of the central guide member and the spring. The openings communicate with openings 58 in the base wall of the housing and with the interior of the shell 14 so that air can proceed through the desiccant bed. Disposed radially outward of the inlet openings is a generally planar annular region 102 of the plate which closes off the open end of the housing. The plate is held in place by a crimped arrangement between annular forming plate 110 and the shell 14. A crimp seal is identified at 112 and extends about the periphery of the housing. In addition, the forming plate 110 is welded at selected regions to the plate 94. Further, an annular recess 114 receives a seal member 116, a lower surface of which extends outwardly beyond the forming plate of the air dryer assembly. The lower surface is adapted for engagement with an associated surface on which the air dryer is located.

Figure 3:
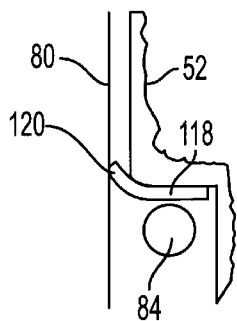
FIG. 3 is an enlarged view of a first preferred form of sliding seal.

FIG. 3 illustrates in detail a preferred form of sliding seal interposed between the spring, central guide member, and the housing. The embodiment of FIG. 3 includes a flexible, substantially flat annular seal 118 that has an inner edge or lip 120 that sealingly engages and slides along the external surface of the central guide tube. An outer radial portion of the seal member is axially interposed between a radial shoulder on the housing and a spring or washer. This configuration serves the primary purpose of sealing between relatively moving components and also advantageously provides flexibility and tolerance stack-up without losing its effectiveness as a primary seal.

Figure 4:
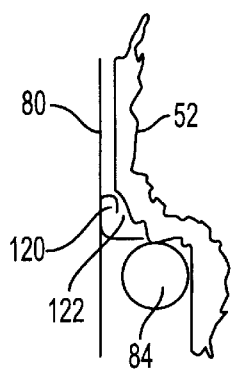

In FIG. 4, the seal has a profile in which the inner region includes a pair of lobes 120, 122 for enhancing the sealed relationship between the central guide tube and the housing. This second preferred embodiment of the seal can be molded to provide accurate sizing and dimensioning of the lobe profile.

Figure 5:
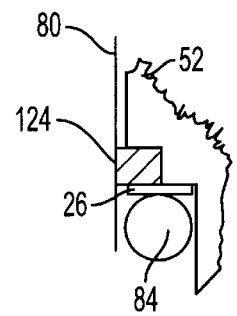
FIGS. 4–6 are enlarged view of alternative embodiments of the sliding seal.

A third preferred embodiment of sliding seal is illustrated in FIG. 5. The sliding seal includes a generally rectangular or square cross-section 124 adapted for sliding engagement with the external surface of the central guide tube. A washer 126 is interposed between the spring and the seal to retain the seal in place, and also impose a compressive force on the seal.

Figure 6:
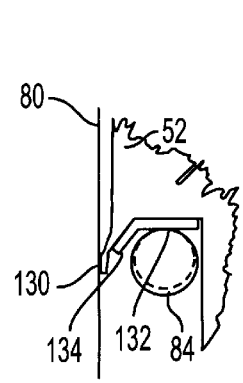

Last, FIG. 6 illustrates yet another sliding seal embodiment. Here, the conformation of the radial shoulder of the housing is modified to define an upturned lip or edge 130. The radially inwardly extending lip 130 is urged against the external wall of the central guide tube by a washer 132 having a tapered region 134 complementary to the sealing lip 130. This configuration provides an inward radial force on the thin wall formed by the radial shoulder of the housing to effect sealing between the air inlet and outlet paths of the air dryer.

During operation, air flow (as represented by arrows) proceeds through the inlet openings in the annular plate, through openings 58 in the base of the housing, and through the outer radial portion of the shell. The air flows through the desiccant beads at this stage and ultimately proceeds radially inward and in the opposite axial direction through the central portion 32 of the housing toward the outlet openings 38.

As described above, it is important that the desiccant bed be placed under a uniform compression. Here, the housing extends over the entire open end of the shell. It is urged inwardly into the shell by the force of the biasing spring 84. Misalignment of components and relative movement between them is permitted as a result of the recess 70 that receives the guide member, as well as the guidance provided by the tapered outer edge 54 of the housing. In addition, the sliding seal 70 accommodates a large range of relative motion between the components of the air dryer. On the other hand, the seal effectively limits communication between the air inlet and the outlet paths, unless flow through the air dryer is plugged or blocked whereby the pressure is sufficient to overcome the lip seal and allow bypass flow into the recess 70 and ultimately to the opening 96 in the plate. The arrangement further provides a self-contained unit that is easily removed and mounted onto an associated structure.

It will be recognized that four preferred embodiments of a sliding seal arrangement between the housing and the central guide member were shown and described. Still other arrangements that effectively provide for sealing engagement while accommodating a large range of motion, tolerance for misalignment, and an internal flow bypass should the assembly become plugged, are also contemplated.

The invention has been described with reference to the preferred embodiments. Obviously modifications and alterations will occur to others upon a reading an understanding of this specification. For example, the lower surface 36 of the central cylindrical portion of the housing is shown and described as being axially located at approximately the same position as the base wall 56. However, the depth of the recess 70 may vary, as well as the axial locations of the lower surface and base wall of the housing without departing from the present invention. Likewise, the height of the tower may vary, it being understood that such variation alters the path of the air through the desiccant. This application is intended to include all such modifications and alterations insofar as they come within the scope of the appended claims or the equivalents thereof.

Having thus described the invention, it is now claimed:

1. A compressed air dryer comprising:
   a shell having an open end for receiving a desiccant material therein;
   a housing dimensioned for receipt in the shell through the open end, the housing contacting the shell about its inner periphery and thereby defining a cavity adapted to receive the desiccant material between the housing and shell;
   a plate received in the shell on an opposite side of the housing from the cavity for retaining the housing in the shell;
   a biasing member interposed between the plate and the housing for urging the housing from the open end into the shell; and
   a guide member extending into the housing adjacent a central region of the housing for orienting the housing into the shell.

2. The invention of claim 1 wherein the guide member extends from one face of the plate into the shell and the housing includes an annular recess received over the guide member for aligning the housing as it is biased into the shell.

3. The invention of claim 2 further comprising inlet openings in the plate and the housing for the passage of air into the cavity, and an outlet opening in the housing for allowing air to exit the cavity.

4. The invention of claim 3 further comprising a sliding seal interposed between the guide member and the housing for sealing between the inlet and outlet openings.

5. The invention of claim 1 wherein the guide member is a separate component from the plate.

6. The invention of claim 5 further comprising a seal member between the guide member and the plate.

7. The invention of claim 1 wherein the housing includes a substantially circumferentially continuous wall having a peripheral edge that slidingly engages an interior surface of the housing for additional guiding of the housing relative to the shell.

8. The invention of claim 7 wherein the housing has a generally cylindrical central portion and a radially outward annular portion surrounding the central portion.

9. The invention of claim 8 wherein the guide member extends into an axially extending recess radially interposed between the central and annular portions of the housing.

10. A compressed air dryer comprising:
    a shell receiving a desiccant material therein;
    a housing dimensioned for sliding receipt in the shell and defining a cavity adapted to receive the desiccant material therein, the housing having an inlet and outlet communicating with an air passage that extends through the desiccant material in the cavity;
    a plate received in the shell on an opposite side of the housing from the cavity for retaining the housing in the shell;
    a biasing member interposed between the plate and the housing for urging the housing into the shell; and
    a sliding seal engaging the housing and sealing between the inlet and outlet.

11. The invention of claim 10 further comprising a guide member operatively associated with the housing for orienting the housing in the shell.

12. The invention of claim 11 wherein the guide member includes an elongated surface slidably received in a recess formed in the housing.

13. The invention of claim 12 wherein the guide member is disposed along a central portion of the housing.

14. The invention of claim 13 further comprising a peripheral surface on the housing that slidably engages the shell.

15. The invention of claim 14 wherein the peripheral surface is substantially parallel to the elongated surface of the guide member.

16. The invention of claim 12 wherein the seal engages a shoulder formed in the housing and has a flexible portion that slidably engages the elongated surface of the guide member.

17. The invention of claim 10 wherein the inlet is located along a radial outer portion of the housing and the outlet is spaced radially inward from the inlet.

18. The invention of claim 10 wherein the shell is a one-piece member having an open end that receives the desiccant material, housing, the biasing member, a guide member, and the plate therein in stacked relation, the plate having openings therethrough that communicate with the inlet and outlet and are separated from one another by the sliding seal.

* * * * *